Aug. 26, 1952  J. KENNEDY  2,608,005
SYSTEM FOR SIMULATING AIRCRAFT ENGINE STARTING
Filed Oct. 1, 1949  2 SHEETS—SHEET 2

INVENTOR.
JAMES KENNEDY
BY Orin R. Severn
his ATTORNEY.

Patented Aug. 26, 1952

2,608,005

UNITED STATES PATENT OFFICE 2,608,005

SYSTEM FOR SIMULATING AIRCRAFT ENGINE STARTING

James Kennedy, Woodridge, N. J., assignor to Curtiss-Wright Corporation, a corporation of Delaware Application October 1, 1949, Serial No. 119,037

19 Claims. (Cl. 35—12)

This invention relates to a system for simulating aircraft operation and particularly to a system for simulating the starting procedure for one or more aircraft engines primarily for purposes of ground training of aircraft personnel.

In actual practice, the engine starting operation of a large multi-engine aircraft is necessarily somewhat involved due to the various conditions that must be met before the engine can be started and kept running. For example, certain prerequisites for the starting of each engine include available fuel supply on pressure, a proper mixture ratio of fuel and air, and proper manipulation of the various ignition, primer and starter switches and buttons. It is therefore highly desirable that aircraft personnel be thoroughly indoctrinated and trained in procedure of this character on the ground since the allocation of a modern multi-engine commercial transport for example, for training purposes involves both personnel and property risk and taking the aircraft out of productive operation.

A principal object of the present invention therefore is to provide in connection with ground training apparatus, improved means for realistically simulating the engine starting procedure of modern multi-engine aircraft.

The invention will be more fully set forth in the following description referring to the accompanying drawing, and the features of novelty will be pointed out with particularity in the claims annexed to and forming a part of this specification.

Referring to the drawings.

Instructors' and students' control panels

Figure 3:
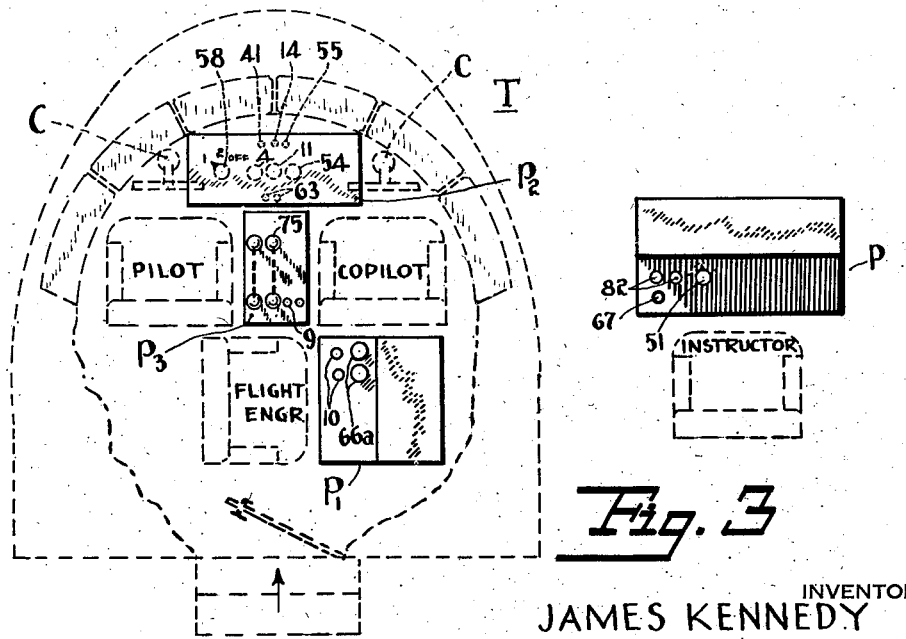
Fig. 3 is a plan view of one form of grounded aircraft trainer including the student's and instructor's stations and control panels to which the present invention is applicable.

Referring first to Fig. 3, the instructor is provided with a control panel or console P on which he sets up certain conditions, such as the engine priming time corresponding to the simulated air temperature or other simulated factors. These conditions may also include the need for the "booster" ignition in the case of a "cold" engine. The instructor can also require "emergency" fuel boost and take an engine out of operation at any time and prevent its starting again by throwing a switch so as to simulate an engine with "frozen" bearings for example. The priming time, or need for "boost," may be established by means of a selector switch indicated at 51, other controls being here indicated simply as switch knobs 67 and 82.

The student is also provided with control panels that are located at his station in the trainer generally represented by T. The trainer is constructed so as to simulate the cockpit and control room of a modern multi-engine aircraft with pilot and co-pilot seats behind the control columns C as indicated, as well as a station with control panel or console $P_1$ for the flight engineer. It will be understood that the term "student" as used in this specification is intended to comprehend any one or all members of the crew undergoing training.

The simulated start and engine controls involved in the present invention represent a standard arrangement of switches and control buttons as in practice and the control panels are preferably mounted at the usual locations, i. e., the overhead panel at $P_2$, the engineer's panel or console $P_1$, at the rear, the throttle quadrant at $P_3$ between the pilot and co-pilot, etc., so as to simulate as closely as possible the arrangement and appearance of an actual control room. The various simulated controls on the panels $P_3$, $P_1$ and $P_2$ are indicated by reference numbers corresponding to similar parts in the electrical system of Fig. 1 and the function thereof will be described in connection with Fig. 1. Thus, the student can be trained in the shortest possible time since nothing new is present to confuse him when he takes over the controls of actual aircraft after completing his ground training.

Electrical simulating system

The essential relationship between the more important parts of the simulating system for single-engine operation is diagrammatically indicated by the simplified flow chart of Fig. 2 and reference to this figure will be made in connection with the detail description of Fig. 1.

In general, the various simulated engine control switches and buttons on the student's panels are electrically interrelated in a network by relay and other circuits so that a predetermined set of conditions must exist before the electrical system can simulate engine starting. A key element in the system is a so-called "reset" coil or relay that is related to the engine starting circuit in such a way that energization of the reset coil for any reason such as a failure of any one of several prerequisite conditions prevents operation of the engine starting circuit. The system illustrated in Fig. 1 is for the purpose of simulating dual-engine operation, although it will be understood that any number of engines can be simulated by the system. A description of the starting operation of a single engine, namely the No. 1 engine, will be adequate for the purposes of the present invention since each engine is separately started by similar procedure.

Figure 1:
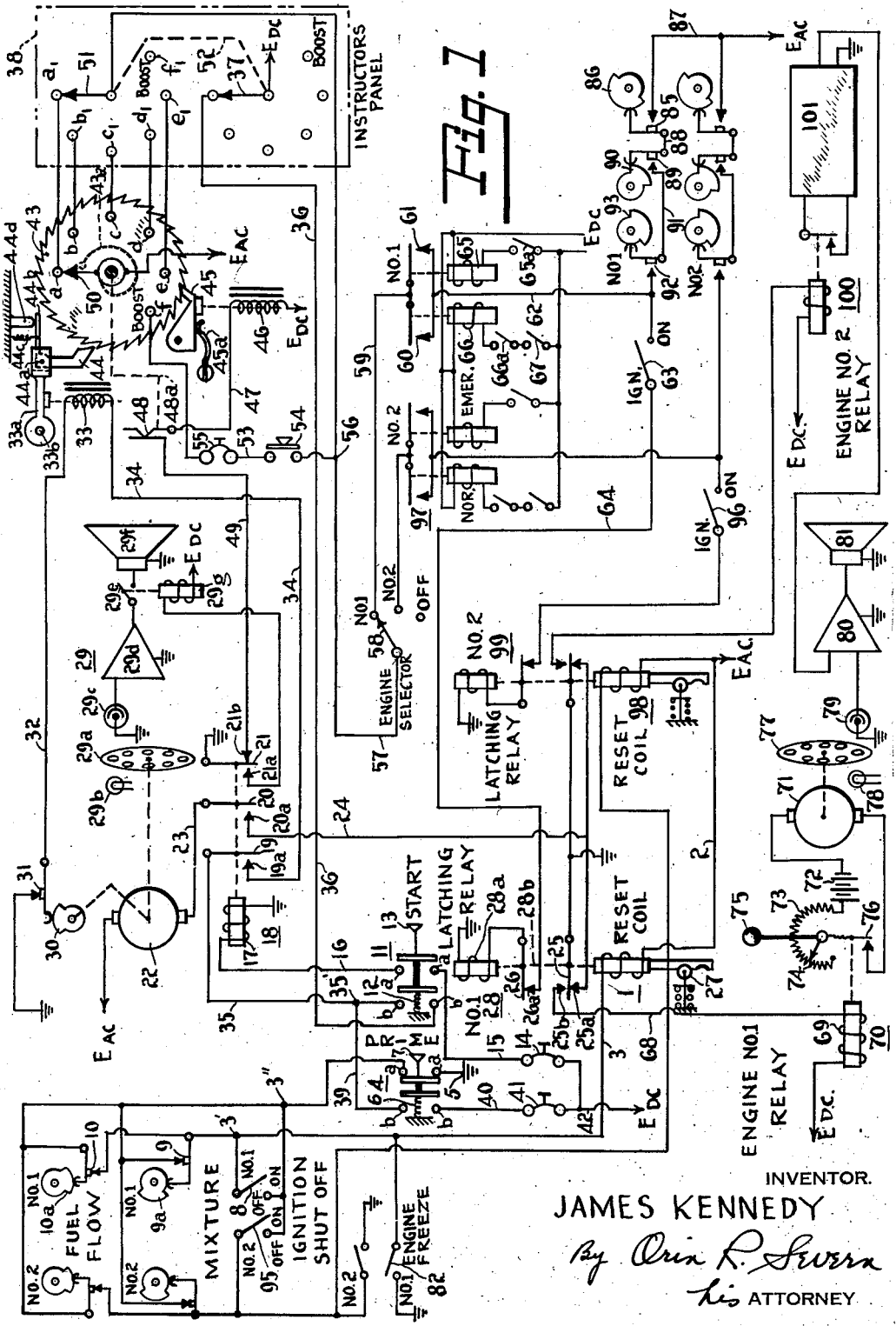
Fig. 1 is a circuit diagram, in part schematic, of an electrical system embodying the present invention for simulating the engine starting procedure of aircraft.
Figure 2:
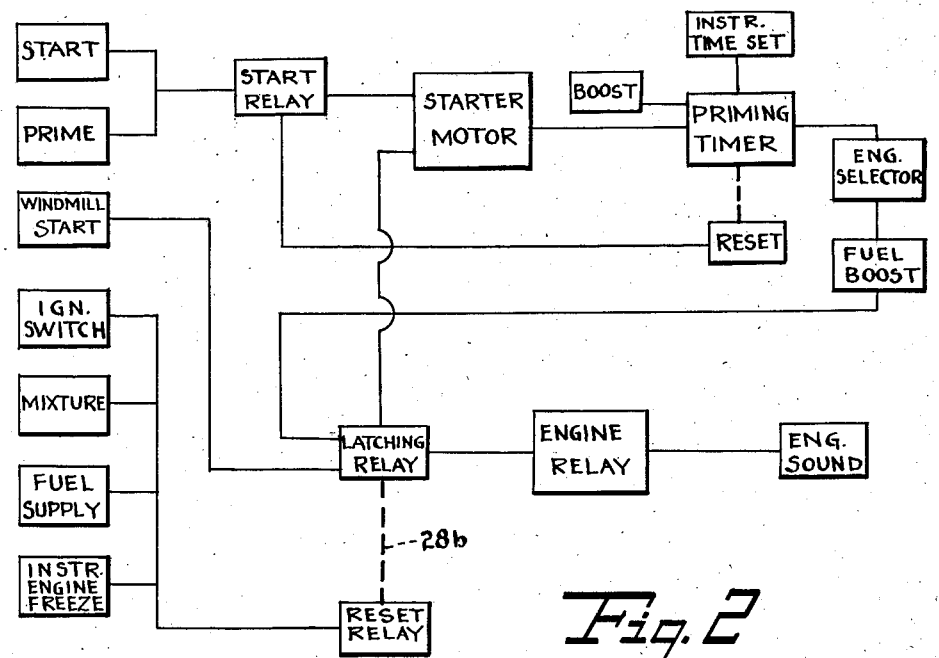
Fig. 2 is a flow diagram illustrating in a general manner the component parts of the aforesaid system and the functional relationship thereof.

Referring specifically now to Fig. 1, the reset coil 1 is connected at one terminal by a conductor 2 to a source of A. C. voltage $E_{ac}$ as indicated. The other terminal of the reset coil is connected by conductor 3 and junction 3' to a plurality of parallel circuits presently described. These circuits terminate at a common junction 3'' that is connected through the "a" contacts of a "primer" switch 4 to a common ground 5. The primer switch is normally biased by a spring 6 toward closed position of the "a" contacts which are opened only when the student presses the switch button 7 during the starting operation. The parallel circuits interconnecting the reset coil 1 and the primer switch 4 include the "ignition cut-off" circuit having an "ignition" switch 8 movable between the "on" and "off" positions indicated. For reasons presently described, the ignition shut-off switch 8 is actually in the open circuit position to designate "on." Accordingly, when the ignition shutoff switch is at "off" it will be noted that the circuit of the reset coil 1 is completed through ignition switch 8 and the "a" contacts of the primer switch 4 to ground. Therefore in accordance with the previous statements, the starting operation cannot proceed until the reset coil is de-energized, this being accomplished by moving the ignition shutoff switch 8 to "on" and maintaining open the other parallel circuits.

The circuits in parallel with the ignition shut-off switch comprise a circuit having a "mixture setting" switch 9 and a circuit having a "fuel flow" indicating switch 10. These switches 9 and 10 may be operated in any suitable manner according to simulated starting conditions to indicate respectively the simulated mixture ratio of fuel and air, and simulated available fuel supply under pressure. The switch 9 may be positioned by a cam 9a so as to be closed when the mixture setting is less than 41 degrees for example and open when the setting is greater than 41 degrees, the latter representing a prerequisite condition for starting. The fuel flow switch 10 may be positioned by a cam 10a so that the switch is closed when the simulated fuel flow is zero and opened when the fuel flow is greater than zero, the latter of course being another prerequisite for starting. Simulated fuel flow may be controlled by the student flight engineer. Hence it will be seen that when the mixture setting and fuel flow switches are positioned according to proper starting conditions, the respective parallel circuits are open so that no current can flow through these circuits to energize the reset coil 1.

With these preliminaries completed, the system is in readiness for starting which is initiated by the student pushing the buttons of both the simulated "start" switch 11 and the "prime" switch 4. The start switch 11 is normally biased by a spring 12 to the open position shown so that the "a" contacts of the start switch are held closed only as long as the student presses the switch button 13. This operation completes a circuit including a source of D. C. voltage $E_{dc}$, a simulated overhead panel circuit breaker 14, conductor 15, "a" contacts of start switch 11, conductor 16, and coil 17 of the "starter motor" relay 18, thereby energizing said relay. So actuated, the relay 18 simultaneously draws in the gang-operated contacts 19, 20 and 21 so as to make contact with the corresponding fixed contacts 19a, 20a and 21a respectively. The circuit is simultaneously broken at the back contact 21b.

Thus the circuit of the simulated "starting motor" 22, which is energized from the source of A. C. voltage $E_{ac}$ indicated, is completed through conductor 23, contacts 20—20a, conductor 24 and contacts 25 and 25a controlled in part by the reset coil 1. Contact 25 is connected to ground and is positioned as shown when the reset coil is energized. De-energization of the reset coil by itself does not change the position of the gang-operated contacts 25 and 26 by reason of a resilient detent 27 coacting with the reset coil plunger so that positive action is required to move the contacts 25 and 26 in either direction. The positive action for moving the contacts in the opposite direction is provided by a latching relay 28 hereinafter described. As diagrammatically indicated, the contacts 25 and 26 are connected to both the reset coil and latching relay plungers for gang operation in either direction.

The starter motor 22 which is now energized is connected to a sound system generally indicated at 29 for simulating the noise of an engine starter motor. A specific sound simulating system is illustrated by way of example and may comprise a disc 29a rotatable by the motor 22 and provided with a series of suitably shaped apertures circumferentially arranged in the disc. At one side of the disc opposite the apertures is a source of light 29b and at the opposite side in alignment therewith is a photoelectric tube 29c connected to an amplifier 29d. The output of the amplifier is connected through a switch 29e to a loudspeaker 29f so that when the switch 29e is closed, the light pulses established by rotation of the disc 29a are translated into sound pulses in simulation of motor noise. The starter noise switch 29e is controlled by a relay 29g, the coil of which is energized from a source of D. C. voltage $E_{dc}$ through a circuit including contacts 21—21a of the starter motor relay 18. Consequently when the starter motor relay is de-energized in response to the opening of the start switch 11, the starter noise relay circuit is broken at contacts 21—21a and the sound system is cut off.

The motor 22 is also connected to a cam 30 for periodically opening and closing a switch 31 that is connected by conductor 32 to a solenoid 33 of a ratchet device hereinafter described for alternately energizing and de-energizing the solenoid for determining the simulated engine priming time. The energizing circuit of the solenoid 33 also includes conductor 34, contacts 19a—19 of the starter motor relay, conductor 35, the "b" contacts of the start switch 11, conductor 36 and selector switch 37 on the instructor's panel 38, the switch 37 being connected to a source of D. C. voltage $E_{dc}$ as indicated. An alternate circuit for energizing the ratchet solenoid 33 is connected to conductor 35 at junction 35' in parallel with the start switch "b" contacts and includes conductor 39, the "b" contacts of the prime switch 4, conductor 40, simulated overhead panel circuit breaker 41, conductor 42 and the source of D. C. voltage $E_{dc}$ indicated. This alternate circuit provides for normal operation of the ratchet solenoid 33 if the student uses a well-known technique of "jiggling" alternately the prime and start buttons. Since the No. 1 position of the "priming time" switch 37 on the instructor's panel represents minimum priming time, i. e. starting under most favorable conditions, the ratchet solenoid must be energized through the "prime" switch when a longer "priming time" is set up by the instructor.

The ratchet device for determining the simulated priming time comprises a ratchet wheel 43 and a coacting pawl 44 that is actuated by the solenoid 33 so as to advance the ratchet wheel a step each time the solenoid is energized in response to a revolution of the starter motor cam 30. The pawl 44 is pivotally carried at 44a at the end of the solenoid armature 33a, in turn pivoted at 33b. An extension arm 44b of the pawl is resiliently biased by a spring 44c so that the pawl is urged toward the ratchet teeth of the wheel 43, but in the de-energized position of solenoid 33, i. e. when the armature 33a is spring-held in the upper position, the pawl is held out of engagement with the teeth by means of a fixed stop 44d engaging the extension arm 44b.

When the solenoid is operated the pivot 44a of the pawl 44 is moved downward with respect to the stop 44d so that the spring bias at 44c rotates the pawl counterclockwise into engagement with the ratchet teeth. The wheel 43 is suitably spring biased as indicated at 43a against the stepping movement above described and the ratchet is held in each advanced position by a second pawl 45 that is spring biased at 45a into holding engagement with the ratchet teeth. The pawl 45 is adapted to release the ratchet wheel by means of a ratchet reset solenoid 46 which when energized attracts the pawl 45 against the bias of its spring. During the normal starting operation, the ratchet reset solenoid is de-energized at the contacts 21—21b of the starter motor relay, this circuit including a source of D. C. voltage $E_{dc}$, the solenoid winding, conductor 47, a limit switch 48 (that is mechanically connected to the ratchet wheel as indicated at 48a and arranged to be held open in the initial or minimum prime time position thereof), conductor 49, contacts 21b—21 and ground. The limit switch 48 is allowed to close only after the "stepping" operation of the ratchet device has started. Accordingly, the ratchet reset solenoid cannot be energized through the series-connected contacts 48 and 21b—21 to reset the ratchet device until the starter motor relay 18 is de-energized which indicates that the starter motor has been shut off.

The ratchet wheel 43 is provided with a number of peripherally located contacts a, b, c, d, e and f which are spaced so as to correspond with predetermined steps of the ratchet wheel. The contacts are adapted to coact with a fixed brush contact 50 that is connected to a source of A. C. voltage $E_{ac}$ as indicated and the wheel contacts a, b, c, d, e and f are electrically connected to corresponding fixed contacts $a_1$, $b_1$, $c_1$, $d_1$, $e_1$ and $f_1$ of a selector switch 51 mounted on the instructor's panel 38. The instructor's switches 37 and 51 are mechanically connected at 52 for gang operation as indicated. Accordingly, a circuit through the instructor's priming time switch 51 is established only when the ratchet wheel has advanced to the point where the brush contact 50 engages the coacting contact that corresponds to the one selected by the instructor on panel 38. For example, if the instructor moves the priming time switch to contact $c_1$, the ratchet wheel must be moved counterclockwise until the brush 50 engages contact c in order to connect the selector switch with the source of voltage $E_{ac}$. Thus the priming time switch can be set, say on contact $a_1$ to indicate practically instant starting or on any of the following contacts up to and including contact $e_1$ to indicate that greater starting time is required, the ratchet wheel in each case advancing to the corresponding contact for completing a connection with the voltage source for establishing "engine operation" as presently described.

The instructor simulates the need for "booster" ignition in the case of a "cold" engine by setting the priming time switch 51 on contact $f_1$ indicating "boost." This, in effect, simply disconnects the switch 51 from the ratchet wheel circuits, contact $f_1$ being dead. The corresponding contact f on the ratchet wheel is connected by conductor 53 to the booster switch 54 which is in series with the simulated overhead panel circuit breaker 55, thereby establishing a parallel circuit with the selector switch 51. Accordingly, when the selector switch is set at the "boost" position, the ratchet wheel is rotated throughout its range and then stops at a limit block at f so that the student becomes aware of the necessity of boost operation by failure of the engine to start. He then presses the "boost" switch 54 thereby completing the parallel circuit to junction 56. During this operation, the "start" button 13 should be held closed; otherwise the starter relay 18 is de-energized, causing resetting of the ratchet device and thereby requiring restarting of the cycle. The remainder of the circuit for completing the simulated starting operation comprises conductor 57, engine selector switch 58 (the starting operation of "engine" No. 1 being described), conductor 59, two parallel-connected "fuel boost" switches 60 and 61 for simulating "normal" and "emergency" fuel boost, conductor 62, "ignition" switch 63, conductor 64, contacts 26a—26 of the latching relay 28, and the energizing coil 28a of the latching relay which is connected to ground. The "ignition" switch 63 and the "ignition shut-off" switch 8 are preferably structurally combined for common operation by the student so as to represent a single "ignition" switch. Thus the latching relay is energized by the circuit established through the ratchet wheel contacts and the primer time selector switch (or booster switch), and the series-connected engine selector and fuel boost switches, Figs. 1 and 2.

It will be noted that either the normal or emergency fuel boost relay must be energized in order to complete the above described control circuit; otherwise starting cannot be simulated. The coil 65 of the emergency fuel boost relay for example can be connected to an energizing circuit $E_{dc}$ and controlled by a switch button 65a operated by the student flight engineer for simulating emergency fuel boost operation and the normal fuel boost relay coil 66 can be controlled by both the student and instructor in similar manner. The coil 66 is connected in series with the student's switch 66a and the instructor's switch 67, Fig. 3, so that the instructor can disable the normal boost relay so as to simulate the need for "emergency" boost.

Returning to the latching relay 28, it will be noted that energization of this relay and consequent lifting of the gang-operated contacts 25 and 26 breaks the aforesaid control at contacts 26 and 26a, thereby de-energizing the latching relay. However, the contacts remain in the last operated position by reason of the spring detent 27 previously described, the plungers of the latching relay and reset coil being mechanically interconnected as indicated at 28b, Figs. 1 and 2. Concurrently with breaking of this control circuit, the contacts 25 and 25b are engaged to complete a circuit including conductor 68, the energizing coil 69 of the main "engine" relay 70, and a source of D. C. voltage $E_{dc}$ as indicated. A simplified sound system for simulating engine noise is also illustrated and comprises essentially the same arrangement as for the starter motor system. A motor 71 is connected to an energizing circuit including a source of voltage 72, a rheostat 73, a coacting contact 74 adjustable by a simulated throttle control 75, and an "on-off" switch 76 controlled by the engine relay 70. When the relay is energized, the circuit is completed and the motor 71 rotates at a speed dependent on the throttle setting. The motor operated apertured disc 77, light source 78, photoelectric cell 79, amplifier 80 and loud speaker 81 function in the same manner as the starter motor sound system above described. It will be apparent that the engine No. 2 sound system can be connected as indicated to the amplifier input for common loud speaker operation. Thus the engine throb is simulated in the sound system according to the throttle setting.

The "engine" continues in operation until the reset coil 1 is again energized thus lowering the gang operated contacts 25 and 26 and breaking the engine relay circuit at the contacts 25—25b. Normally this is done by the student moving the ignition shut-off switch 8 to the indicated "off" position, thereby energizing the reset coil through the ignition shut-off switch and the "a" contacts of the prime switch 4 as previously described. Failure of the fuel supply as indicated by closing of the fuel flow switch 10 also has the same effect. The instructor can, if desired, simulate "freezing" of the engine bearings by closing of the corresponding engine switch 82 on his panel thereby energizing the reset coil through a parallel circuit and de-energizing the engine relay 70, Figs. 1 and 2.

In the actual operation of aircraft, it sometimes becomes necessary to start an engine during flight after the engine has been shut down and the propeller feathered for some reason. The starting procedure involves decreasing the simulated propeller pitch from feather until the engine is "windmilled" at a simulated speed somewhat above 1100 R. P. M., after which the ignition switch is closed. This system is designed to override the normal starting system and is operative only when certain prerequisite conditions relating to fuel flow and mixture are met. The details of a simulated propeller pitch control system are omitted in the interest of clarity since a description thereof is unnecessary for a complete understanding of the present invention.

This part of the starting system is simulated by the present invention by means of a control circuit paralleling that portion of the previously described control circuit including the start switch, starter motor, priming time switch panel, and the engine selector and booster switches. To this end, a switch 85 is controlled by a cam 86 according to simulated engine R. P. M. The cam operates under student control to close the switch when simulated R. P. M. is greater than 1100 R. P. M. and to open the switch when it is less than 1100 R. P. M. The switch is connected by conductor 87 to a source of A. C. voltage $E_{ac}$ as indicated and also by conductor 88 to a second series connected switch 89 likewise operated by a cam 90 between opened and closed positions. This switch as in the case of switch 10 represents fuel flow and when the cam is in position representing the simulated fuel flow as greater than zero the switch is closed, and when the fuel flow is represented by the cam as zero the switch is opened. This switch in turn is connected by conductor 91 to a third series-connected switch 92 representing mixture setting. This switch is operated by cam 93 so that when the simulated mixture setting is represented as less than 41 degrees the switch is opened and when the mixture setting is greater than 41 degrees the switch is closed. The three series connected switches are in series with the "ignition" switch 63 so that when the prerequisite conditions obtain the previously described circuit including the ignition switch 63, conductor 64 and latching relay 28 can be energized from conductor 87 and source $E_{ac}$ independently of the remainder of the system. Since the engine starting operation during flight is simulated by means of the latching relay 28, it will be apparent that energization of the reset coil 1 in the manner previously described is sufficient to stop the engine.

After the No. 1 engine has been "started" and is "running," the procedure is repeated for simulating the starting of the No. 2 engine, and so on. The student simply moves the engine selector switch 58 to the No. 2 position, the No. 2 ignition shut-off switch 95 to the "on" position and the No. 2 ignition switch 96 to the "on" position. The other switches relating to the No. 2 engine must indicate prerequisite starting conditions in respect to mixture, fuel flow, etc. The same start and prime buttons are used by the student as before but the engine selector switch now cuts in the circuits of the No. 2 fuel boost relay 97, reset coil 98 and latching relay 99 for energizing the No. 2 engine relay 100. The sound system of this engine partly indicated at 101 may be combined with the sound system of engine No. 1 by using the same amplifier and loud speaker.

It should be understood that this invention is not limited to specific details of construction and arrangement thereof herein illustrated, and that changes and modifications may occur to one skilled in the art without departing from the spirit of the invention.

What is claimed is:

1. Means for simulating aircraft engine starting for training aircraft personnel comprising electrical means representing an engine starting motor, means representing a starter switch operable by a student for controlling said starting means, timing means adjustable by an instructor for representing required priming time and operable according to operation of said starting means, and means representing an aircraft engine responsive to said timing means only after predetermined operation thereof.

2. Means for simulating aircraft engine starting for training aircraft personnel comprising an electric motor representing an engine starting motor, means representing a starter control operable by a student for controlling said motor, timing means including circuit controlling means adjustable by an instructor for representing required priming time and operable according to operation of said motor, and means representing an aircraft engine responsive to said circuit controlling means in accordance with predetermined operation of said timing means.

3. Means for simulating aircraft engine starting for training aircraft personnel comprising a motor representing an engine starting motor, means for controlling said motor including a switch representing an engine start control operable by a student, timing means adjustable by an instructor including a ratchet device for representing required priming time and operable according to operation of said motor, and means representing an aircraft engine responsive to said timing means only after predetermined operation of said ratchet device.

4. Means for simulating aircraft engine starting for training aircraft personnel comprising a motor representing an engine starting motor, means for controlling said motor including a switch representing an engine start control operable by a student, a ratchet device operable according to operation of said motor, switching means adjustable by an instructor to represent required priming time and controlled by said ratchet device, and means representing an aircraft engine responsive to said switching means only after predetermined operation of said ratchet device.

5. Means for simulating aircraft engine starting for training aircraft personnel comprising a motor representing an engine starting motor, means for controlling said motor including a switch operable by a student representing an engine start control, electromagnetic means operable by said motor, a ratchet device for representing required priming time and operable by said electromagnetic means, circuit controlling means adjustable by an instructor and operable by said ratchet device, and means representing an aircraft engine responsive to said circuit controlling means only after predetermined operation of said ratchet device.

6. Means for simulating aircraft engine starting for training aircraft personnel comprising means representing an engine starting motor, means for controlling said starting means including a switch representing an engine start control operable by a student, timing means adjustable by an instructor for representing required priming time and operable according to operation of said starting means, electrical means representing an aicraft engine responsive to said timing means only after predetermined operation thereof, and means adapted to be positioned to represent prerequisite conditions for proper engine operation for de-energizing said electrical means when otherwise positioned.

7. Means for simulating aircraft engine starting for training aircraft personnel comprising electrical means representing an engine starting motor, a simulated starter control operable by a student for controlling said starting means, timing means adjustable by an instructor for representing required priming time and operable according to operation of said starting means, means representing an aircraft engine responsive to said timing means only after predetermined operation thereof, and a plurality of switches adapted to be positioned to represent respectively prerequisite conditions for proper engine operation, any one of said switches being arranged to cause de-energization of said engine means when otherwise positioned.

8. Means for simulating aircraft engine starting for training aircraft personnel comprising a motor representing an engine starting motor, means for controlling energization and de-energization of said motor including a switch representing an engine starter control operable by a student, a selector switch positioned by an instructor to represent variable engine priming time, a relay, multiple switching means adapted to be connected in circuit with said selector switch and operable by said motor for operating said relay at the exporation of the simulated priming time means, means representing an aircraft engine responsive to the operation of said relay, and means controlled by said relay for de-energizing said motor.

9. Means for simulating aircraft engine starting for training aircraft personnel comprising electric motive means representing an engine starting motor, means for controlling energization and de-energization of said motive means including a switch representing a starter control operable by a student, timing means for representing required engine priming time including a pair of multiple switching means adapted to establish a control circuit, one of said switching means being operable by said motive means and the other being adjustable by the instructor whereby said control circuit is established after predetermined operation of the first switching means by said motive means, and means representing an aircraft engine responsive to said control circuit.

10. Means for simulating aircraft engine starting for training aircraft personnel comprising a motor representing an engine starting motor, means for controlling energization and de-energization of said motor including a switch representing an engine starter operable by a student, a first relay, means responsive to the operation of said motor for operating said relay, a second relay operatively connected to said first relay and arranged to override the control of said first relay, means representing an aircraft engine responsive to said first relay, additional switches representing mixture setting and fuel supply conditions respectively, said switches being positioned according to the corresponding simulated conditions for controlling said second relay, and means operable by an instructor for also controlling said second relay so as to de-energize said engine representing means.

11. Means for simulating aircraft engine starting for training aircraft personnel comprising electric motive means representing an engine starting motor, means for controlling energization and de-energization of said motive means including a switch representing a starter control operable by a student, means adjustable by an instructor to represent variable engine priming time, a relay, means operable by said motive means and controlled by said adjustable means for operating said relay at the expiration of the simulated priming time, means representing an aircraft engine responsive to said relay, and means positioned according to simulated prerequisite engine operating conditions for causing operation of said relay and de-energization of said engine means.

12. Means for simulating aircraft engine starting for training aircraft personnel comprising a motor representing an engine starting motor, a simulated primer control operable by a student, means for controlling said motor including a relay and a switch representing an engine start control, switching means adjustable by an instructor including a ratchet device for representing required priming time, said ratchet device adapted to be operable according to operation of said motor, said simulated primer and start controls being adapted jointly to maintain an operative connection between said motor and ratchet device through said relay, means responsive to said relay for controlling resetting of said ratchet device, electrical means representing an aircraft engine responsive to said switching means only after predetermined operation of said ratchet device, and means adapted to be positioned to represent prerequisite conditions for proper engine operation for de-energizing said electrical means when otherwise positioned.

13. Means for simulating aircraft engine starting for training aircraft personnel comprising a motor representing an engine starting motor, means for controlling energization and de-energization of said motor including a switch representing an engine starter control operable by a student, a selector switch positioned by an instructor to represent variable engine priming time, a relay, a ratchet device including multiple switching means operable by said motor and adapted to be connected in circuit with said selector switch, said relay being responsive to said switching means at the expiration of the simulated priming time, means representing an aircraft engine responsive to the operation of said relay, and means controlled by said relay for de-energizing said motor.

14. Means for simulating aircraft engine starting for training aircraft personnel comprising electric motive means representing an engine starting motor, means for controlling energization and de-energization of said motive means representing a starter control operable by a student, timing means for representing required engine priming time adapted to establish a control circuit, said timing means being jointly operable by an instructor and by said motive means whereby said control circuit is established after predetermined operation of said motive means, a latching relay responsive to said control circuit, a reset relay operatively connected to said latching relay for overriding the control of said latching relay, means representing prerequisite engine operating conditions for controlling said reset relay, and means representing an aircraft engine responsive to said latching relay.

15. Means for simulating aircraft engine starting for training aircraft personnel comprising electric motive means representing an engine starting motor, means for controlling energization and de-energization of said motive means including a switch representing a starter control operable by a student, contact means adjustable by an instructor to represent variable engine priming time, a relay, switching means adapted to be connected in circuit with said contact means and operable by said motive means for operating said relay at the expiration of the simulated priming time, means representing an aircraft engine responsive to said relay, and additional switches representing mixture setting and fuel supply conditions respectively, said switches being positioned according to the corresponding simulated conditions and arranged to override said relay and cause de-energization of said engine means.

16. Means for simulating aircraft engine starting for training aircraft personnel comprising electrical means representing an engine starting motor, a simulated starter control operable by a student for controlling said starting means, timing means adjustable by an instructor for representing required priming time and responsive to operation of said starting means, said timing means also adapted to be disabled by said instructor to represent ignition "boost" requirements, means representing an aircraft engine normally responsive to said timing means after predetermined operation thereof, and auxiliary means representing "boost" control operable by said student for controlling said engine representing means when said engine means does not respond to said timing means.

17. Means for simulating aircraft engine starting for training aircraft personnel comprising a motor representing an engine starting motor, means for controlling said motor including a switch representing an engine start control operable by a student, timing means adjustable by an instructor for representing required priming time and responsive to operation of said motor, electrical means representing an aircraft engine responsive to said timing means after predetermined operation thereof, and a control circuit bypassing said timing means for also controlling said electrical means, said control circuit including a plurality of switches operable to represent prerequisite conditions for simulated "windmill" starting and engine operation.

18. Means for simulating aircraft multiple engine starting for training aircraft personnel comprising a single motor representing an engine starting motor, means for controlling said motor including a switch representing an engine start control operable by a student, timing means adjustable by an instructor for representing required priming time and operable according to operation of said motor, a control circuit including means representing an engine selector switch established by said timing means after predetermined operation thereof, and individual means for representing each aircraft engine connected to said engine selector means and arranged to be energized by the corresponding control circuit.

19. Means for simulating aircraft multiple engine starting for training aircraft personnel comprising a single motor representing an engine starting motor, means for controlling said motor including a switch representing an engine start control operable by a student, timing means adjustable by an instructor for representing required priming time and responsive to operation of said motor, a control circuit including means representing an engine selector switch established by said timing means after predetermined operation thereof, and individual means for representing each aircraft engine including engine simulating means, a pair of interlocked relays, one of said relays being connected to said engine selector switch and arranged to energize said engine simulating means and the other of said relays being adapted to override the first relay, said overriding relay being controlled according to simulated prerequisite engine operating conditions.

JAMES KENNEDY

REFERENCES CITED

The following references are of record in the file of this patent:

UNITED STATES PATENTS

| Number | Name | Date |
|---|---|---|
| 2,366,603 | Dehmel | Jan. 2, 1945 |
| 2,468,781 | Roganti | May 3, 1949 |
| 2,486,488 | Lukacs | Nov. 1, 1949 |
| 2,494,594 | Swank | Jan. 17, 1950 |
| 2,506,949 | Burelbach | May 9, 1950 |
| 2,510,500 | Hayes | June 6, 1950 |
| 2,533,484 | Lukacs et al. | Dec. 12, 1950 |

OTHER REFERENCES

Aviation Magazine, August 1944, pp. 195 and 270-273.